March 18, 1930.  W. M. BARRY  1,750,986
DISPLAY OR ADVERTISING DEVICE
Filed March 22, 1928
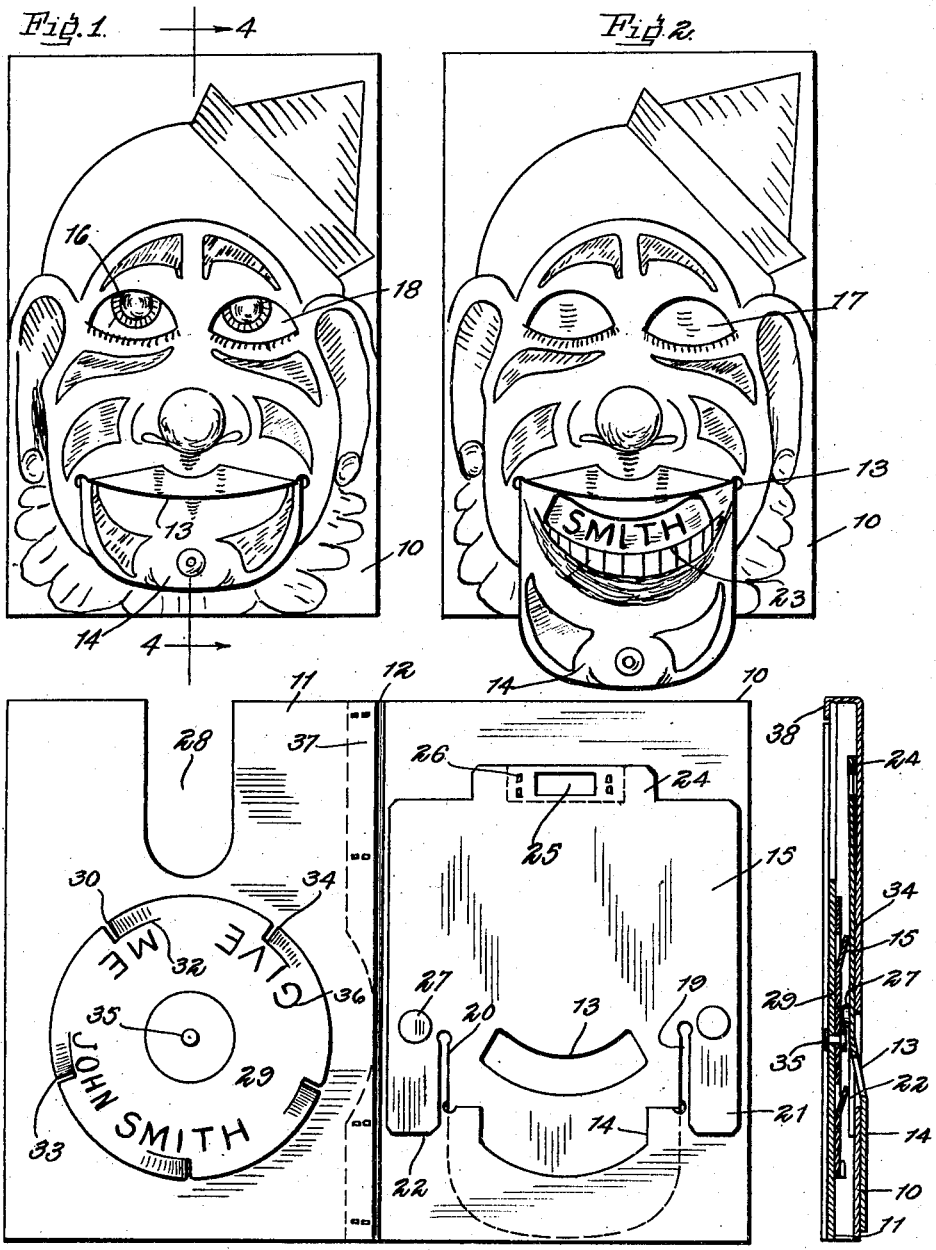
Inventor
Walter M. Barry
By his Attorney Patented Mar. 18, 1930

1,750,986

UNITED STATES PATENT OFFICE

WALTER M. BARRY, OF NEW YORK, N. Y.

DISPLAY OR ADVERTISING DEVICE

Application filed March 22, 1928. Serial No. 263,633.

My invention relates to improvements in display or advertising devices, and it is the principal object of my invention to provide a mechanically operatable device for the successive display of advertisements, campaign slogans or the like in the mouth of the representation of a human head, such as for instance the head of a clown, as illustrated as an example, or of Uncle Sam or any other representation of human or animal faces, printed, painted, embossed or otherwise made on a card-board or similar suitable surface.

Another object of my invention is the provision of a device of this character which is extremely simple in its construction and therefore inexpensive, yet durable and efficient in its operation.

A further object of my invention is the provision of a display or advertising device including a manually or otherwise operated mechanism for intermittently operating a means such as a disc or discs bearing suitable inscriptions, pictures or the like, which, when put in operation, will effect the display of the legends or inscriptions, or other data, in proper sequence before an opening such as for instance the representation of a figure's mouth, etc.

A still further object of my invention is the provision of a display or advertising device consisting of two connected main parts or plates, foldable upon each other, and held together to enclose the operating parts of the device.

These and other objects and advantages of my invention will become more fully apparent as the description thereof proceeds, and will then be specifically defined in the appended claims.

In the accompanying drawing, forming a material part of this disclosure:

Fig. 1 is a front view of the device in inoperative position with the mouth closed.

Fig. 2 is a view similar to Figure 1 showing the device in operative position with the mouth open to display the advertisement.

Fig. 3 is an interior view of the device, unfolded.

Fig. 4 is a section on line 4—4 of Figure 1.

The display or advertising device illustrated as one example of the many ways to practically construct my invention, consists of two main parts, plates or pieces of for instance cardboard 10, 11 flexibly and foldably connected in any suitable manner at their inner meeting side edges, as at 12.

The part 10 carries on its outer face the representation of a human face or of an animal, etc., for instance as shown the representation or picture of a clown, which may be drawn, painted, embossed or otherwise made thereon, and which has normally the mouth 13 closed, however with the tongue 14 protruding therefrom, as illustrated in Figure 1, to represent a chin.

Over the inner or rear face of part 10 slides a cardboard piece 15 which is displaceably guided so as to allow its free movement in a vertical direction.

This cardboard 15 bears on its front face the representations of the eye pupils 16 as shown in Figure 1 and above the same the eye lids 17 as shown in Figure 2 both adapted to successively appear in front of the eye openings 18 in the part 10 according to the position of the cardboard 15 at the time.

The tongue 14 is shaped at the lower edge of the plate 15 below the mouth 13 by the slots 19 and 20, so that outer depending flaps 21, 22 are formed.

The teeth 23 are painted on the front face of part 15 above and below the mouth opening 13.

The upper edge of part 15 has formed therewith a flap or tongue 24 provided with a finger opening 25, properly reinforced, as indicated at 26.

Operating pins 27 or the like are projecting out of the plane of the inner face of part 15 as shown in Figure 3.

As illustrated, the part 11 has a slot or recess 28 formed in its upper edge in approximately the middle thereof and of dimensions such as to allow a gripping of tongue 24 and operation of the part 15 by means of a finger inserted into opening 25.

The part 11 carries on its inner face in properly selected position a disc 29 having its periphery radially slotted as at 30 and for a certain distance slotted parallel to the periphery as at 32, so that yielding tongues 33 are formed bent out of the plane of the disc to form abutments or shoulders 34. The disc 29 is rotatably secured to part 11 by means of a centrally located rivet 35 or the like, and its front face shows the concentrically arranged legends to be successively displayed in the mouth opening 13, as for instance as shown, the legend 36, "Give me Al Smith", if the device is for instance to be used during a political campaign, or any other slogan or legend of an advertising, etc., nature.

Reinforcing strips 37 are attached at the folding inner edge and similar strips 38 are formed along the outer side edges to allow a holding together of the parts 10 and 11 when folded upon one another.

The operation of my device will be entirely clear from the above description and by the simultaneous inspection of the drawing, and it will be evident that the upward movement of the slide 15 by means of a finger inserted in opening 25 will give the device the appearance in Figure 1, while a downward movement of the slide will close the eyes and open the mouth so that one part of the legend or disc 29 will appear in the mouth opening as illustrated in Figure 2.

The legends on the disc will appear in their consecutive order in the mouth opening upon each downward movement of the slide as the pins 27 engage the abutments 34 to rotate the disc. It will be clear that owing to the bending of the tongues 33 out of the plane of the disc 29 and the direction of the abutments thus formed towards one side only, during the downward movement of the slide 15 the pin on the right hand side will engage the abutments of the tongues 33 and rotate the disc while the pin on the left hand side will slide over the yielding tongues and their abutments. During the upward movement of the slide the pin on the left hand side will engage the abutments of the tongues and the pin on the right hand side will slide over the yielding tongues and depress the abutments. The tongue 14 protruding out of the mouth when same is closed as in Figure 1, is properly painted to form the chin.

It will be understood that I have disclosed as one example of the many ways in which my device may be practically constructed its preferred form only, and that I may make such changes in its arrangement and in the construction of its minor details or parts as come within the scope of the appended claims, without departure from the spirit of my invention and the principles involved, so for instance I may make the slide laterally displaceable instead of vertically, may use other representations than those shown, and employ other legends, advertising matter, etc.

Having thus described my invention, what I claim as new and desire to secure by Letters Patent is:

1. Display and advertising device comprising, two main parts foldably connected for forming a housing when folded against each other, flaps for holding the parts in their folded and closed positions, the front part provided with display openings, a slide containing proper pictorial illustrations sliding along the inner face of said front part, a disc rotatably held on the rear part, and a plurality of abutments formed on said disc, means on said slide for engaging said abutments, and a means on said slide for displacing the same to engage and disengage said abutment engaging means from said abutments, for displaying legends on said disc successively in their consecutive order through one of said displaying openings.

2. A display and advertising device comprising a front part having a pictorial representation displayed on its front, a mouth opening and eye openings formed therein, a rear part, means connecting both parts at the inner side edges for allowing a folding of one part against the other, means for holding the parts engaged in their folded or closed position to constitute a housing, a slide adapted to slide along the inner face of the front part, and a disc rotatably held to the rear part oppositely disposed to said slide, abutments on said disc pointing and yielding in one direction, pins on said slide, and a means for operating said slide to engage alternately during its downward and upward movement, with its pins the abutments on said disc for successively displaying advertisements on said disc in their consecutive order through said mouth opening.

3. In a display device of the character described the combination of a face plate provided with openings therethrough, with a slide adapted to be vertically displaced along the inner face of said face plate and having painted thereon eye-pupils and eye-lids as well as teeth for displaying upon proper operation of said slide said pupils and said lids, in rear of the representation openings of the face plate to create the impression of open and closed eyes, means for displacing said slide, and a means for displaying advertisements and teeth through the mouth opening in said face plate in their consecutive order.

4. In a display and advertising device of the character described two foldably connected plates, means for holding both plates together in their folded position, one of said plates having a plurality of openings and the other a recess, a slide gliding over the inner face of one of the plates and having pictorial representations thereon to appear before several of said openings, a rotatable disc bearing advertisements on the recessed plate, yielding abutments on said disc pointed in one direction, and pins on said slide adapted to alternately engage the abutments during the vertical displacement of said slide to display the advertisements on said disc successively through one of the openings in one of said plates, and a means for manually displacing said slide.

5. In a display and advertising device of the class described the combination of a front plate representing a face in front and having a plurality of eye openings and a mouth opening therebelow, with a recessed rear plate, a disc carrying advertising legends concentrically arranged therewith, and a slide vertically displaceable along the inner face of said front plate and having the representations of eye pupils, eye-lids and teeth thereon, the former adapted to successively appear in front of the eye openings by the proper manipulation of the slide to create the impression of open and closed eyes respectively and the latter to appear in front of the mouth opening, a tongue formed with said slide normally representing a chin and adapted to be projected through the mouth opening, and a means for displaying the advertisements through the mouth opening of said face plate.

6. In a display and advertising device, a housing, a disc rotatably secured to one wall of said housing, having its periphery radially and parallelly slotted to said periphery to form yielding tongues bent out of the plane of the disc to form abutments pointing in one direction only, a slide and pins on said slide, one of said pins adapted to engage during the movement of the slide in one direction successively, the abutments to rotate said disc, the other of said pins sliding during this time over the yielding tongues, while it is adapted to engage during the movement of the slide in the opposite direction, said abutments to rotate the disc in the opposite direction with the first named pin sliding over the yielding tongues.

Signed at New York, in the county of New York and State of New York, this 16th day of March, A. D. 1928.

WALTER M. BARRY.